United States Patent
Bengtsson et al.

(10) Patent No.: US 12,149,324 B2
(45) Date of Patent: Nov. 19, 2024

(54) SYSTEM AND METHOD FOR PASSIVE REFLECTION OF RF SIGNALS

(71) Applicant: SONY GROUP CORPORATION, Tokyo (JP)

(72) Inventors: Erik Bengtsson, Eslöv (SE); Fredrik Rusek, Eslöv (SE); Olof Zander, Södra Sandby (SE)

(73) Assignee: Sony Group Corporation, Tokyo (JP)

(*) Notice: Subject to any disclaimer, the term of this patent is extended or adjusted under 35 U.S.C. 154(b) by 468 days.

(21) Appl. No.: 17/608,969

(22) PCT Filed: May 5, 2020

(86) PCT No.: PCT/EP2020/062472
§ 371 (c)(1),
(2) Date: Nov. 4, 2021

(87) PCT Pub. No.: WO2020/254031
PCT Pub. Date: Dec. 24, 2020

(65) Prior Publication Data
US 2022/0231753 A1 Jul. 21, 2022

(30) Foreign Application Priority Data
Jun. 19, 2019 (SE) .................... 1950761-5

(51) Int. Cl.
*H04B 7/145* (2006.01)
*H04B 7/06* (2006.01)
*H04B 7/08* (2006.01)

(52) U.S. Cl.
CPC ........... *H04B 7/145* (2013.01); *H04B 7/0695* (2013.01); *H04B 7/088* (2013.01)

(58) Field of Classification Search
CPC ...... H04B 7/145; H04B 7/0695; H04B 7/088; H04B 7/06; H04B 7/08; H04B 7/0617;
(Continued)

(56) References Cited

U.S. PATENT DOCUMENTS

| 9,853,702 B1 | 12/2017 | Liang |
| 10,090,887 B1 | 10/2018 | Rofougaran |

(Continued)

FOREIGN PATENT DOCUMENTS

| CN | 105103372 A | 11/2015 |
| CN | 108964723 A | 12/2018 |

(Continued)

OTHER PUBLICATIONS

International Search Report and Written Opinion from corresponding International Application No. PCT/EP2020/062472, Jul. 10, 2020, 11 pages.

(Continued)

*Primary Examiner* — Lana N Le
(74) *Attorney, Agent, or Firm* — Tucker Ellis LLP

(57) ABSTRACT

A system for reflecting an RF signal comprises a plurality of antenna units configured to receive the RF signal and passively reflect the RF signal. The antenna units are reconfigurable to achieve beamforming in reception and reflection, respectively, of the RF signal. The system may be a Large Intelligent Surface (LIS). A control system is configured to: detect (301) a wake-up signal WUS1, and after detecting WUS1, perform a first training operation (I) comprising: receiving (302), by the antenna units, a first reference signal RS1 from a first device D1 and reconfiguring (303) the antenna units based on RS1 to achieve beamforming in reception in a direction of D1. By the combination of WUS1 and the first training operation, the system may be automatically configured to achieve beamforming in relation to D1 which is thereby enabled to communicate via the system.

16 Claims, 5 Drawing Sheets

(58) Field of Classification Search
CPC ..... H04B 7/024; H04B 7/0404; H04W 16/28; H04W 52/0274; H04W 52/028; H04W 28/0226; H04W 52/0245; H04W 28/0236; H04W 40/16; H04W 40/244; G01S 2013/468; G01S 7/006
See application file for complete search history.

(56) References Cited

U.S. PATENT DOCUMENTS

| | | | |
|---|---|---|---|
| 2008/0045154 | A1 | 2/2008 | Wu |
| 2016/0042169 | A1 | 2/2016 | Polehn |
| 2019/0053321 | A1* | 2/2019 | Islam ............... H04B 7/088 |
| 2019/0165843 | A1* | 5/2019 | Shang ............. H04B 7/0626 |
| 2019/0174436 | A1* | 6/2019 | da Silva ......... H04B 7/0695 |
| 2019/0319686 | A1* | 10/2019 | Chen .............. H04B 7/0695 |
| 2021/0111778 | A1* | 4/2021 | Jung ................ H04B 7/088 |
| 2021/0298052 | A1* | 9/2021 | Namba ......... H04W 52/0245 |
| 2023/0308139 | A1* | 9/2023 | Baligh ............. H04B 7/0617 |
| 2024/0012124 | A1* | 1/2024 | Cetinoneri ......... G01S 7/006 |

FOREIGN PATENT DOCUMENTS

| | | | | |
|---|---|---|---|---|
| CN | 109586759 | A | | 4/2019 |
| KR | 1526413 | B1 * | 6/2015 | ......... H04L 12/4625 |
| WO | WO-2017200948 | A1 | | 11/2017 |
| WO | WO-2018132308 | A1 | | 7/2018 |

OTHER PUBLICATIONS

Office Action and Search Report from corresponding Swedish Application No. 1950721-9, Jan. 24, 2020, 10 pages.
Abdelrahman Taha et al., "Enabling Large Intelligent Surfaces with Compressive Sensing and Deep Learning," Apr. 23, 2019, 33 pages.
Qingqing Wu et al., "Intelligent Reflecting Surface Enhanced Wireless Network: Joint Active and Passive Beamforming Design," 2018 IEEE Global Communications Conference, Dec. 18, 2018, 6 pages.
Chongwen Huang e tla., "Reconfigurable Intelligent Surfaces for Energy Efficiency in Wireless Communication," arXiv:1810.06934v5, Jun. 10, 2019, 13 pages.
Qingqing Wu et al., "Intelligent Reflecting Surface Enhanced Wireless Network via Joint Active and Passive Beamforming," IEEE, copyright 2019, 16 pages.
Search Report from Swedish Patent Application 1950761-5, Mar. 12, 2020, 2 pages.
Qingqing Wu et al., "Intelligent Reflecting Surface Enhanced Wireless Network: Joint Active and Passive Beamforming Design," 2018 IEEE Global Communications Conference (GLOBECOM), Dec. 9, 2018, 6 pages.
Qingqing Wu et al., "Beamforming Optimization for Wireless Network Aided by Intelligent Reflecting Surface with Discrete Phase Shifts," arXiv:1916.03165v1, Jun. 7, 2019, 30 pages.
Sergi Abadal et al., "Computing and Communications for the Software-Defined Metamaterial Paradigm: A Context Analysis," Digital Object Identifier 10.1109, IEEE ACCESS.2017.2693267, May 17, 2017, 11 pages.
Ertugrul Basar, "Transmission Through Large Intelligent Surfaces: A New Frontier in Wireless Communications," 2019 European Conference on Networks and Communications (EuCNC), Apr. 16, 2019, 6 pages.
Senglee Foo, "Liquid-crystal reconfigurable metasurface reflectors," Huawei Technologies Canada, IEEE, copyright 2017, 2 pages.
Sha Hu et al., "Beyond Massive MIMO: The Potential of Data Transmission With Large Intelligent Surfaces," IEEE Transactions on Signal Processing, vol. 66, No. 10, May 15, 2018, 13 pages.
Sean Victor Hum et al., "Modeling and Design of Electronically Tunable Reflectarrays," IEEE Transactions on Antennas and Propagation, vol. 55, No. 8, Aug. 2007, 11 pages.
Hirokazu Kamoda et al., "60-GHz Electronically Reconfigurable Large Reflectarray Using Single-Bit Phase Shifters," IEEE Transactions on Antennas and Propagation, vol. 59, No. 7, Jul. 2011, 8 pages.
Christos Liaskos et al., "A New Wireless Communication Paradigm through Software-controlled Metasurfaces," IEEE Communications Magazine, Sep. 2018, 9 pages.
Fu Liu et al., "Programmable Metasurfaces: State of the Art and Prospects," arXiv:1803.04252v1, Mar. 12, 2018, 5 pages.
Xin Tan et al., "Increasing Indoor Spectrum Sharing Capacity using Smart Reflect-Array," IEEE ICC 2016—Wireless Communications Symposium, Copyright 2016, 6 pages.

* cited by examiner

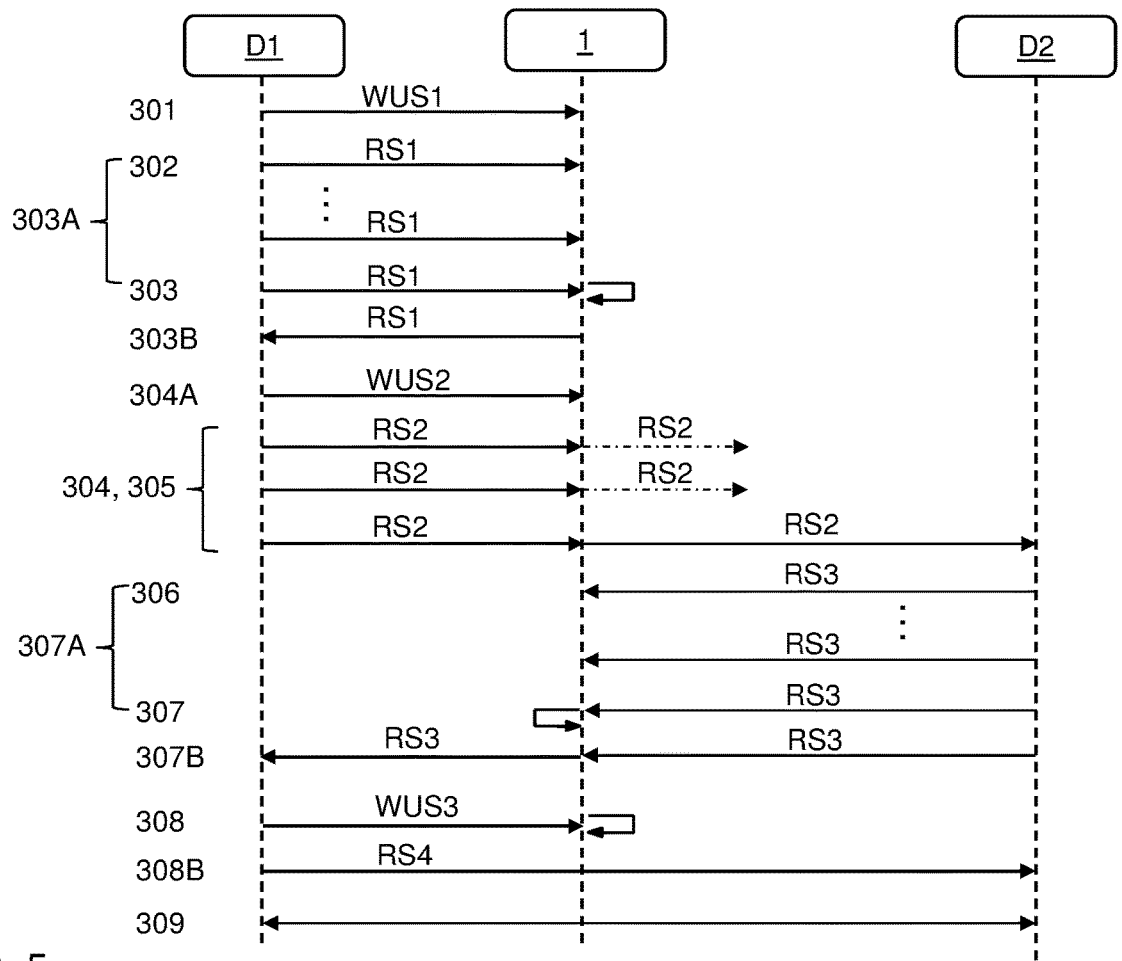
FIG. 5
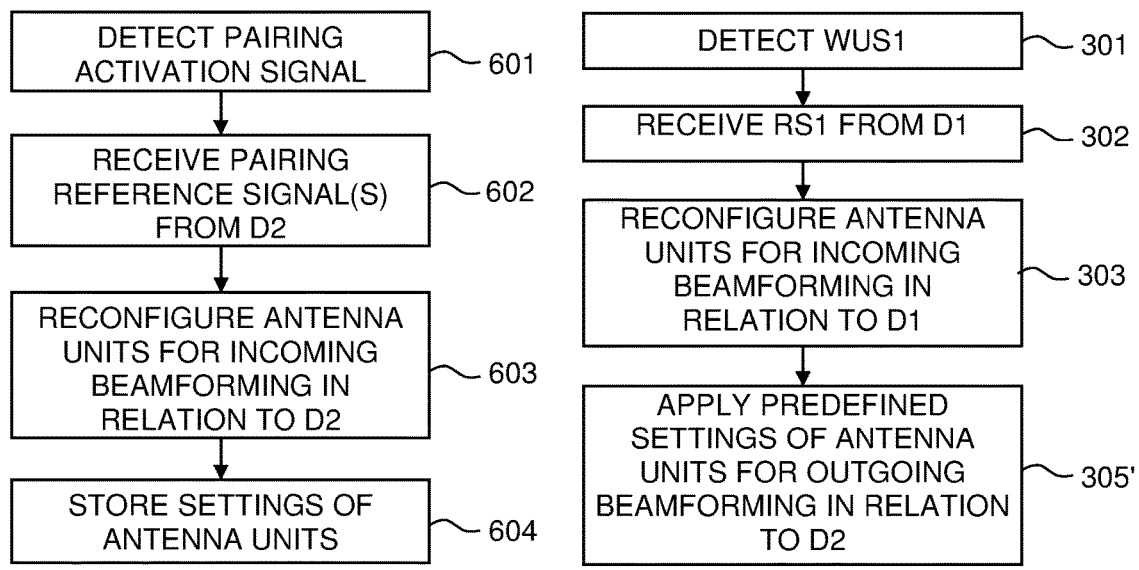
FIG. 6A
FIG. 6B

SYSTEM AND METHOD FOR PASSIVE REFLECTION OF RF SIGNALS

TECHNICAL FIELD

The present disclosure relates generally to wireless communication and, more particularly, to a technique of establishing communication between devices via a system that passively reflects RF (radio frequency) signals.

BACKGROUND

In wireless communications it is beneficial to have many antennas and to locate the antennas in close vicinity to the users. Ultimately, it would be desirable to install antennas everywhere in the surroundings of users.

Recently, a so-called Large Intelligent Surface (LIS) concept has been proposed. The LIS concept may be seen as an extension of traditional massive multi-input multi-output (MIMO), scaled up beyond the traditional large antenna-array concept. The vision is to provide a low hardware footprint structure that may be arranged on or in building facades, walls and ceilings of rooms and factories, etc. However, massive MIMO requires digital baseband processing of the antenna signals to achieve focusing of energy in three-dimensional space. Since the LIS concept would involve an enormous number of antennas, there is an equal number of antenna signals to be processed, either locally at the antennas or at a central processing unit. Such data processing is difficult to implement with reasonable response time and results in excessive power consumption.

To overcome these drawbacks, the article "Large Intelligent Surfaces for Energy Efficiency in Wireless Communication" by C. Huang et al, disclosed in arXiv:1810.06934, proposes a LIS with a vast amount of small and nearly passive reflecting elements with reconfigurable parameters. Each of the LIS reflecting elements may effectively reflect a phase shifted version of the impinging electromagnetic field, and the LIS is stated to perform as a scatterer with reconfigurable characteristics and does not perform either decoding, channel estimation or transmission.

However, while the foregoing article outlines the concept of a passive LIS and presents a theoretical analysis of how to maximize energy efficiency in outdoor LIS-assisted multi-user down-link communication, there still remains significant inventive activity to make the passive LIS concept practically useful.

The prior art also comprises the article "Intelligent Reflecting Surface Enhanced Wireless Network: Joint Active and Passive beamforming Design" by Q. Wu and R Zhang, published in IEEE Transactions on Wireless Communications, vol. 18, no. 11, pp. 5394-5409, November 2019. Here, a single-antenna UE is linked to a multi-antenna AP both directly and via a LIS, denoted "Intelligent reflecting surface" (IRS). To achieve the links, the active transmit at the AP and the reflect by the phase shifters at the IRS are jointly optimized to maximize the total signal power received at the UE. In a distributed optimization algorithm, the AP and IRS independently adjusts the transmit beamforming and phase shifts in an alternating manner until convergence is reached. This optimization requires repeated signal exchange between all three devices (UE, AP and IRS) and may be difficult to implement in practice.

SUMMARY

It is an objective to at least partly overcome one or more limitations of the prior art.

A further objective is to enable wireless devices to communicate via a system for passive reflection of RF signals.

One or more of these objectives, as well as further objectives that may appear from the description below, are at least partly achieved by a system for reflecting an RF signal, a method in a system for reflecting an RF signal, and a computer-readable medium according to the independent claims, embodiments thereof being defined by the dependent claims.

Some embodiments relate to a system comprising a plurality of antenna units that are configured to receive an RF signal and passively reflect the RF signal, with the antenna units being reconfigurable to achieve beamforming in reception and reflection, respectively, of the RF signal. The system is passive in the sense that the reflection is performed without digital signal processing of the incoming RF signal. The system may be a LIS as described in the foregoing, or any other dynamically configurable and passive RF reflection system. In some embodiments, the system is caused to perform a first training operation upon detection of a wake-up signal. The wake-up signal may be transmitted wirelessly from a first device that seeks to establish communication with a second device via the system. Generally, the wake-up signal allows any communication device that is configured to generate and transmit the wake-up signal to remotely activate the first training operation in the system. In some embodiments, the first training operation operates on a first reference signal transmitted by the first device to configure the antenna units of the system to achieve beamforming in reception in a direction of the first device. By the first training operation, the system is thus automatically configured to achieve beamforming in relation to the first device which is thereby enabled to communicate via the system.

In some embodiments, the system has pre-stored settings for the antenna units to achieve beamforming in relation to the second device.

In yet other embodiments, the system is configured to perform a second training operation that involves receiving, by the antenna units, a sequence of second reference signals from the first device, and reconfiguring the antenna units to achieve beamforming in reflection of the second reference signals in a sequence of different output directions. Thereby, the system is caused to sweep the second reference signals in physical space in search for the second device, which may respond to a reflected second reference signal by transmitting a third reference signal, which may be received and reflected by the system to the first device. Thereby, the first device is made aware that a communication link has been established to the second device via the system. By the second training operation, the system is thus operable to automatically locate and achieve beamforming in relation to the second device, which is thereby enabled to communicate with the first device via the system.

Still other objectives, as well as features, aspects and technical effects will appear from the following detailed description, the attached claims and the drawings.

BRIEF DESCRIPTION OF DRAWINGS

Embodiments will now be described in more detail with reference to the accompanying schematic drawings.

2B is a top plan view of the system.

FIG. 5 is an example sequence diagram of signaling by the two wireless devices in relation to the system in FIGS. 4A-4H.

FIG. 6A is a flow chart of an example method of pairing a static wireless device to a system for passive reflection, and FIG. 6B is a flow chart of an example method of training the system subsequent to the pairing of FIG. 6A.

DETAILED DESCRIPTION OF EXAMPLE EMBODIMENTS

Figure 1:
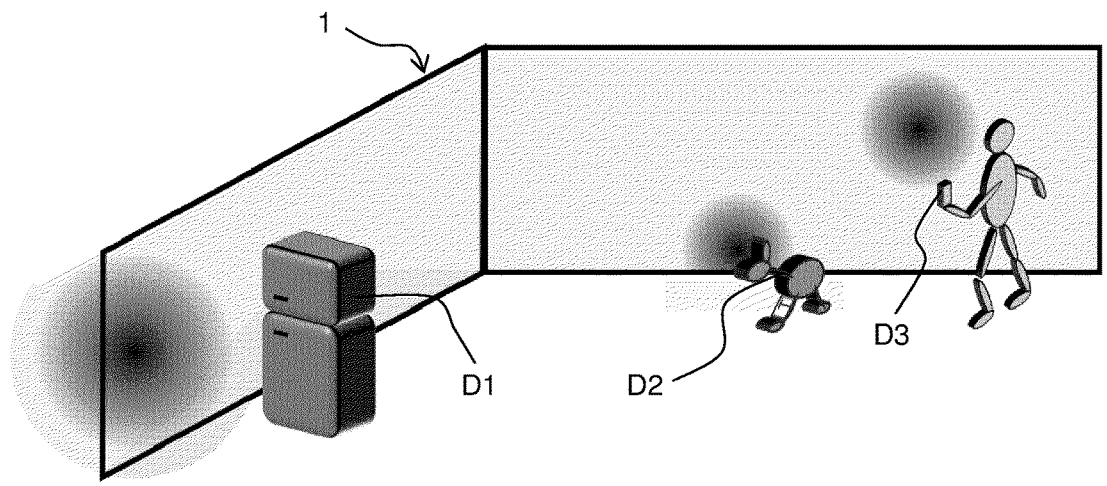
FIG. 1 is a perspective view of user devices interacting with a large intelligent surface (LIS).

Embodiments will now be described more fully hereinafter with reference to the accompanying drawings, in which some, but not all, embodiments are shown. Indeed, the subject of the present disclosure may be embodied in many different forms and should not be construed as limited to the embodiments set forth herein; rather, these embodiments are provided so that this disclosure may satisfy applicable legal requirements. Like numbers refer to like elements throughout.

Also, it will be understood that, where possible, any of the advantages, features, functions, devices, and/or operational aspects of any of the embodiments described and/or contemplated herein may be included in any of the other embodiments described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more", even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments. As used herein, a "set" of items is intended to imply a provision of one or more items.

It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing the scope of the present disclosure. As used herein, the term "and/or" includes any and all combinations of one or more of the associated listed items.

As used herein, an "RF signal" is any electromagnetic signal used for wireless communication and comprising electromagnetic waves with a frequency in the radio spectrum, i.e. in the frequency range from 30 Hz to 300 GHz.

As used herein, "passively reflect" refers to reflection or retransmission of an incoming RF signal without digital signal processing of the RF signal, e.g. for decoding or channel estimation. Preferably, "passively reflect" also implies a reflection without addition of energy to the incoming RF signal before reflection, e.g. by amplification.

As used herein, "beamforming" is used in its ordinary meaning and refers to a technique of operating an array of antennas to achieve a spatial beam focus for an incoming or outgoing RF signal. The beamforming may thus be made "in reception", which means that analog antenna signals received at the different antennas for an incoming RF signal are combined so as to achieve constructive interference for a particular input direction, and optimally with the spatial beam focus at the origin of the incoming RF signal. The beamforming may also be made "in reflection", which means that analog antenna signals that correspond to an incoming RF signal at the different antennas are conditioned so as to achieve constructive interference for a particular output direction and optimally with the spatial beam focus at the intended recipient of the reflected RF signal.

As used herein, "phase align" refers to adjusting two or more analog signals to be in phase with each other. Further, "coherently combine" refers to combining phase aligned analog signals by addition.

As used herein, an "antenna" refers to an antenna element or a piece of a surface which is configured to collect incoming RF signal waves and convert the RF signal waves to an analog signal, e.g. an oscillating electric current.

Embodiments are related to techniques for operating a plurality of antenna units to dynamically enable and establish a communication link between two communication devices communicating by RF signals. The communication devices may be stationary or moveable and of any type, including but not limited to a mobile phone, a PDA, a laptop, a base station, a wearable computer, a wireless sensor, etc. The antenna units are included in a system which is operable to control the antenna units to passively reflect incoming RF signals. The number of antenna units is large. In a non-limiting example, the number of antenna units is 100,000 or more. The antenna units may be fixedly arranged, e.g. distributed across one or more support structures.

Embodiments are applicable to any standardized or proprietary radio based communication technology, including but not limited to 5G NR, 4G LTE, 3G, Wi-Fi, WiMAX, etc.

FIG. 1 shows an example of a system (LIS) 1 which is deployed to establish communication links for various communication devices D1-D3, e.g. user equipment (UE) as shown, to one or more destination nodes (not shown), e.g. other user equipment or one or more base stations (BS). As understood from FIG. 1, the LIS 1 defines a large surface structure which may be arranged on, e.g., the wall of a building (not shown). The LIS 1 is operated to reflect incoming RF signals from D1-D3 to the respective destination node with beamforming. Due to its large extent, the LIS 1 will define a large aperture and collect most of the radiated energy from D1-D3, as indicated by a respective circular region on the LIS 1, and beamform it in relation to the destination node. This results in a significant array gain and spatial focus that enable large power savings and thus green communications. For example, the radiated power of D1-D3 may be so low that D1-D3 cannot establish any communication link directly with the respective destination node without assistance of the LIS 1.

The embodiments described herein presume that the reflection and beamforming by the LIS 1 is a passive process, i.e. without involving buffering or baseband processing of incoming RF signals by the LIS 1. Preferably, the LIS 1 should be activated only when a communication device needs its assistance to establish a communication link. One challenge in this context is to enable D1-D3 to remotely access the LIS 1, which lacks baseband processing capability and, furthermore, may be turned off. Another challenge is to cause the LIS 1, once turned on, to achieve the beamforming in relation to D1-D3. Yet another challenge is to cause the LIS 1 to establish the communication link to the destination node. The destination node is unaware of D1-D3 and will thus not take any action on its own. Further, since the LIS 1 lacks baseband processing capability, it cannot follow any conventional procedure for initial access to a destination node such as a BS. A further challenge is to cause the LIS 1 to achieve beamforming in relation to the destination node. Still further, if an established communication link is interrupted, e.g. as a result of a beam failure, a reconnection mechanism needs to be available.

Figure 2A:
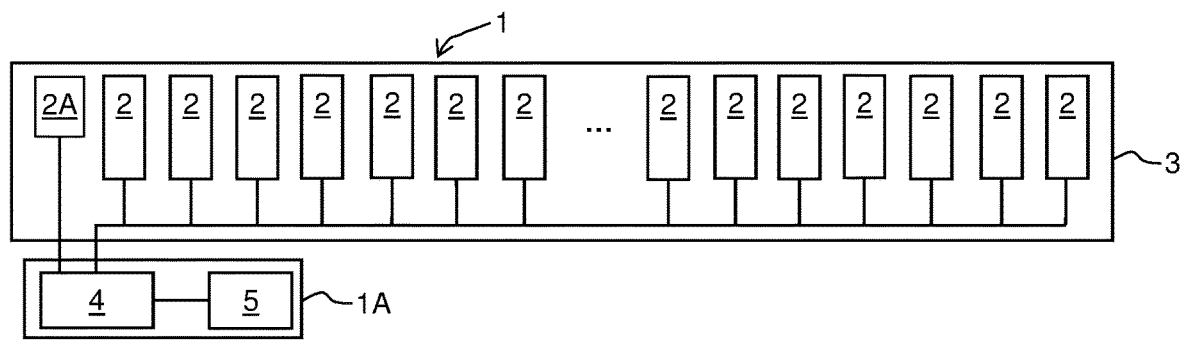
FIG. 2A is a side view, partly in section, of a system for passive reflection in accordance with an embodiment, FIG.
Figure 2B:
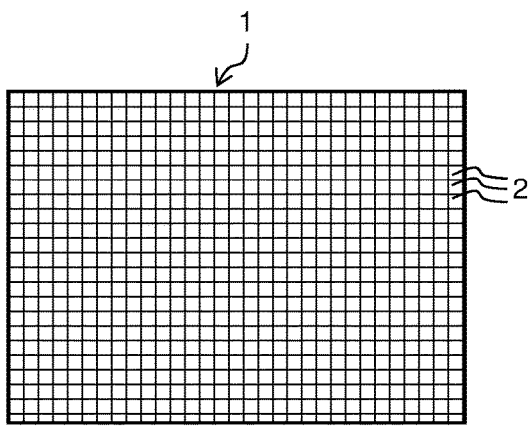
FIGS. 2C-2D illustrate training and operation of a system in relation to two wireless devices.

FIG. 2A is an elevated side view of a system for reflection of RF signals in accordance with some embodiments. The system comprises a panel device 1 with a panel-shaped housing that comprises a support structure 3. A plurality of antenna units 2 that are fixed to and distributed across the support structure 3, e.g. in two-dimensions as exemplified in the top plan view of FIG. 2B. The antenna units 2 are individually reconfigurable to collectively and passively receive and reflect an incoming RF signal with beamforming in both reception and reflection. To achieve beamforming in a selected direction, the antenna units 2 are configured to modify a characteristic of an analog signal ("antenna signal") corresponding to the incoming RF signal. In the following description, it is assumed that the characteristic is the phase, and that the antenna units 2 are configured to impart a controlled phase-shift (or equivalently, time delay) to the antenna signal. Examples of antenna units 2 are described in more detail below with reference to FIGS. 7 and 8A-8B.

Figure 2C:
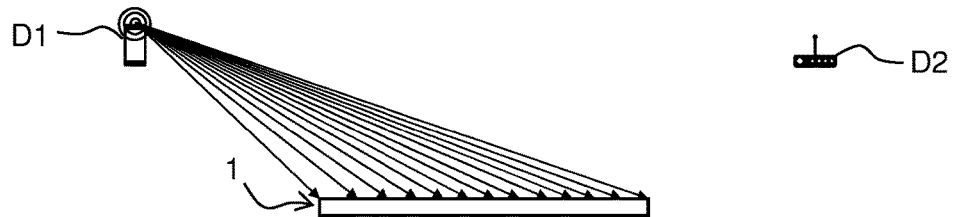
Figure 2D:
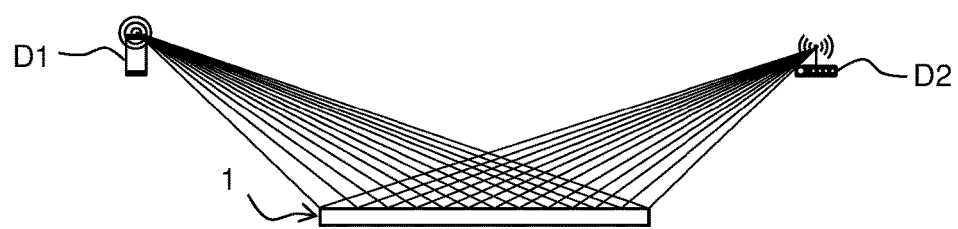

FIGS. 2C-2D schematically illustrate the behavior of the system in accordance with some embodiments. D1 represents a UE that wants to communicate with a base station D2, which is out of reach of RF signals transmitted D1. In the example of FIG. 2C, D1 transmits an RF signal omnidirectionally which is intercepted by the system. In FIG. 2D, the system has been reconfigured to establish a communication link between D1 and D2 by passively reflecting an RF signal from D1 to D2, and vice versa.

It is worth noting that the system is completely different from existing MIMO, beamforming, decode-and-forward relaying and backscatter communication paradigms, which involve RF processing, decoding, encoding and retransmission. Instead, the panel device 1 comprises a large number of passive elements, which reflect an incident RF signal with a selected phase to achieve beamforming in a selected direction, and preferably both in relation to the originating communication device and the destination node.

In the embodiment in FIG. 2A, the panel device 1 further comprises a wake-up sensor 2A. The wake-up sensor 2A is configured to detect and signal presence of one of more dedicated wake-up signals. The wake-up sensor 2A may be of any configuration that does not require digital baseband processing. In one embodiment, the wake-up sensor 2A is configured to listen for a predefined waveform in incoming signals and output an acknowledgement signal when the predefined waveform is detected. The detection of waveforms allows for use of a simple encoding which may be detected by an equally simple receiver. The wake-up sensor 2A may be configured to be responsive to any type of wireless signal and in any wavelength range. In one embodiment, the wake-up sensor 2A is responsive to RF signals. The wake-up sensor 2A may be integrated in the panel device 1, as shown, or be a separate component.

The overall operation of the panel device 1 is controlled by a control device 1A, which may include any type of processing device 4 such as a microprocessor, microcontroller, DSP, CPU, etc. The processing device 4 is connected to the wake-up sensor 2A and to the antenna units 2. The processing device 4 is further connected to a memory device 5 in the control unit 1A. The memory device 5 may comprise one or more of a buffer, a flash memory, a hard drive, a removable media, a volatile memory, a non-volatile memory, a random access memory (RAM), or another suitable device. The processing device 4 may execute instructions stored in the memory device 5 to control the operation of the panel device 1. The instructions when executed by the processing device 4 may cause the panel device 1 to perform any of the methods described herein, or part thereof. The software instructions, which may be supplied to the control device 1A on a computer-readable medium, e.g. a tangible (non-transitory) product such as a magnetic medium, optical disk, read-only memory, flash memory, etc., or a propagating signal.

Figure 3:
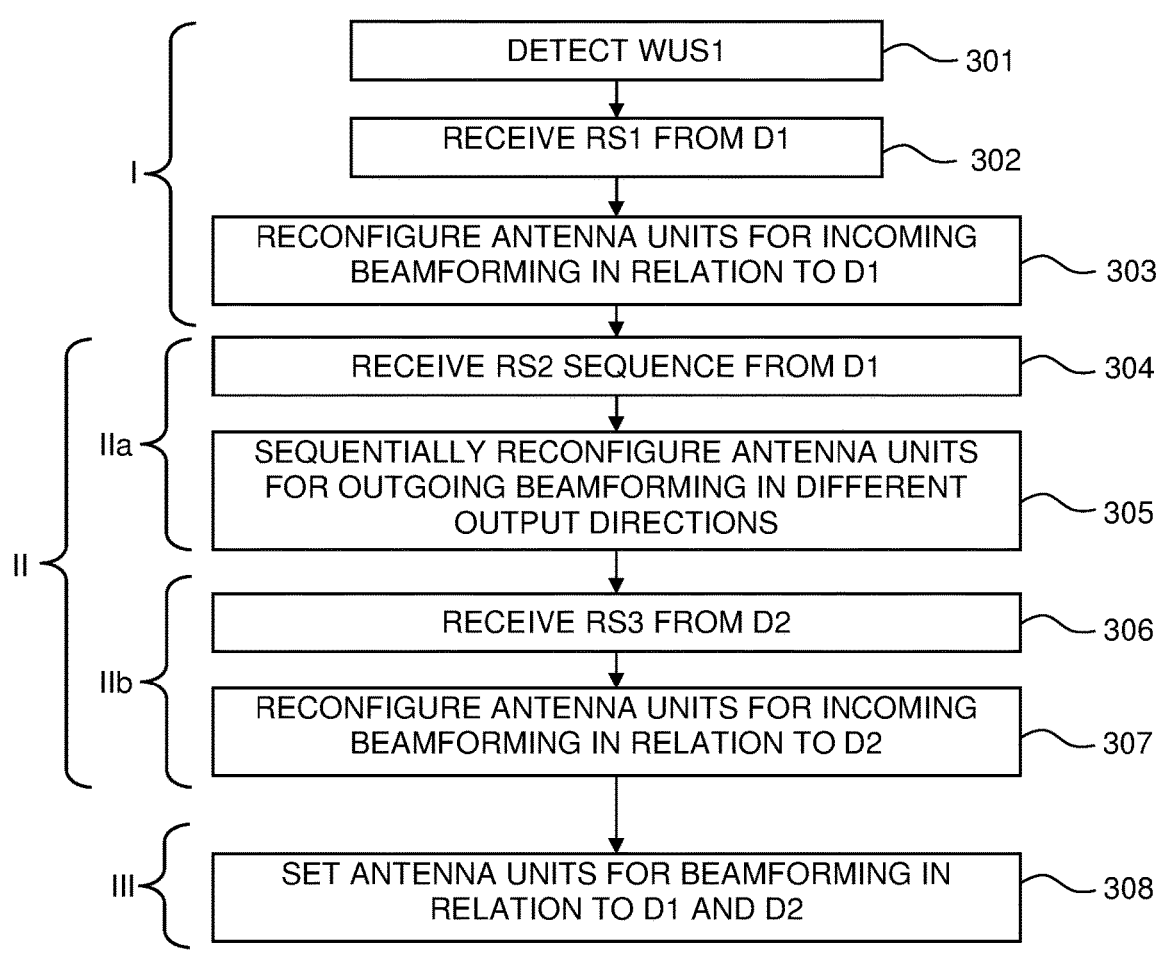
FIG. 3 is a flow chart of an example method of training and operating a system for passive reflection.

In the following, various embodiments of the system as exemplified in FIGS. 2A-2D will be described with reference to FIGS. 3-5. FIG. 3 is a flow chart of an example method performed by such a system, and FIGS. 4A-4H illustrate various steps of the method in relation to the combination of the communication devices D1, D2 and the panel device 1 in FIG. 2C-2D. FIG. 5 is a diagram to exemplify the signaling between the devices D1, D2 and the panel device 1.

The method in FIG. 3 comprises a first training operation I, a second training operation II, and a reflection operation III. The operations I, II and III are performed by the panel device 1. The first training operation I allows a UE, such as D1, to activate the panel device 1 and cause the panel device to adjust its antenna units in relation to D1. The second training operation II comprises a first part IIa, in which the panel device 1 is operated to scan a reflected RF signal in different directions, and a second part IIb, in which a response signal from the destination node, such as D2, causes the panel device 1 to adjust its antenna units in relation to D2. The reflection operation III sets up the communication link between D1 and D2.

Figure 4A:
FIGS. 4A-4H illustrate steps of the example method of FIG. 3 in relation to two wireless devices.
Figure 4A:
Figure 4A:
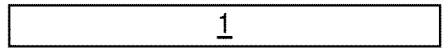
Figure 4B:
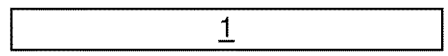
Figure 4C:
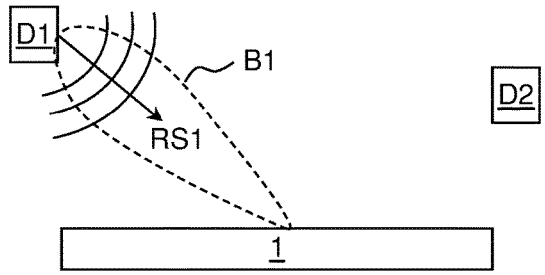

The first training operation I is exemplified in FIGS. 4A-4C. When D1 wants to communicate with D2 via the panel device 1, D1 transmits a dedicated wireless wake-up signal, WUS1, as shown in FIG. 4A. The wake-up signal WUS1 is detected by the wake-up sensor 2A of the panel device 1, which signals detection of WUS1 to the control device 1A (step 301). The control device 1A is thereby caused to activate the panel device 1, unless already active. When active, the antenna units 2 are operative to adjust the settings affecting the receipt and passive reflection of RF signals. As noted above, WUS1 may include a specific waveform to be detected by the wake-up sensor 2A. In a practical scenario where there is more than one panel device in physical space, it is conceivable that a number (N) of different wake-up signals have been predefined (standardized) and that the wake-up sensor 2A of each panel device is responsive to one of the wake-up signals. For example, two panel devices that are close to each other in physical space may be equipped to detect different wake-up signals. If a UE needs assistance of a panel device, it may then transmit the N different wake-up signals. In a variant, assuming that the panel device 1 is static and has a known position in physical space, the UE may determine the wake-up signal(s) to be transmitted based on its current position (e.g. given by a GNSS receiver in the UE) in relation to known positions of the panel devices. In one embodiment, WUS1 may also encode or otherwise indicate control data that causes the panel device 1 to adjust the operation of the antenna units 2. In one example, the control data may designate the bandwidth setting of D1, and the control device 1A may cause a tunable filter of the respective antenna unit 2 to be set so that only frequencies within the bandwidth of D1 are reflected by the antenna units 2. In another example, the control data may comprise an identifier of D2 (cf. FIGS. 6A-6B below).

As shown in FIG. 4B, after transmitting WUS1, D1 proceeds to transmit a first RF signal, which is denoted "first reference signal" and designated by RS1. The panel device 1 receives RS1 from D1 (step 302) and the antenna units 2 are reconfigured to achieve beamforming in reception, denoted "incoming beamforming" in the following (step 303). The incoming beamforming is schematically designated by B1 in FIG. 4C. The skilled person understands that FIG. 4C is a simplification and that B1 may have any shape and may involve reflected signal components. In one embodiment, step 303 comprises determining, for RS1, first individual settings IS1 of the antenna units 2 to achieve the incoming beamforming in the direction of D1. In some embodiments, exemplified below with reference to FIGS. 7 and 8A-8B, the reconfiguration in step 303 involves modifying or tuning the phase of the respective antenna unit 2 so as to phase align analog antenna signals received by the antenna units 2 in response to RS1. Thus, IS1 may comprise a phase or time delay of the respective antenna unit. In one embodiment, the respective antenna unit 2 comprises a local control device that automatically adjusts the phase to achieve the incoming beamforming. In a variant, the phases of the antenna units 2 are adjusted centrally by the control device 1A.

After completion of the first training operation I, the panel device 1 has determined IS1 of the antenna units 2 to achieve the beamforming B1 in relation to D1. In one embodiment, the first training operation I results in the antenna units 2 being configured with IS1. Alternatively, the control device 1A may store IS1 in the memory 5 for later retrieval and configuration of the antenna units 2.

It should be realized that the first training operation I provides the advantages of enabling D1 to remotely access and activate the panel device 1 and of causing the thus-activated panel device 1 to automatically reconfigure to achieve incoming beamforming in relation to D1.

Figure 4D:
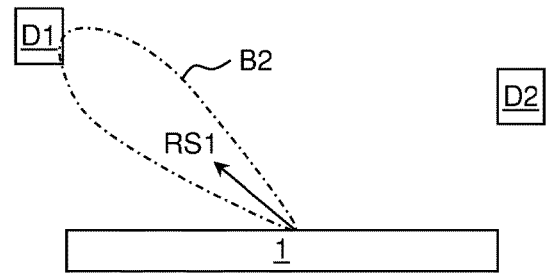

In one embodiment, the first training operation I further comprises reconfiguring the antenna units 2 to passively reflect RS1 with beamforming in the direction of D1, denoted "outgoing beamforming" in the following. Such an embodiment is illustrated in FIG. 4D, where the outgoing beamforming is represented by B2. As shown, the panel device 1 thereby effectively retro-reflects RS1 back to D1. This embodiment inherently causes the panel device 1 to send a verification signal back to D1, which after receiving RS1 may infer that the panel device 1 in indeed awake and has completed the first training phase I.

Figure 4E:
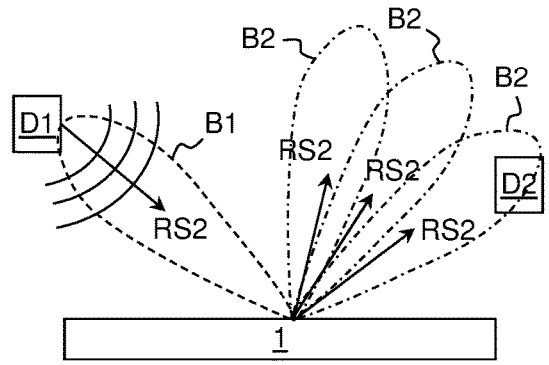

After completion of the first training operation I, and optionally after receiving a second signal WUS2 from D1 by the wake-up sensor 2A, the panel device 1 starts the first part IIa of the second training operation II. Concurrently, e.g. upon receipt of the verification signal (FIG. 4D) or a predefined time period after transmitting WUS1 or RS1, D1 starts to transmit a sequence of second reference signals RS2, which may but need not be distinguishable from RS1. As shown in FIG. 4E, the panel device 1 receives the RS2 sequence from D1 (step 304), preferably with incoming beamforming B1 in relation to D1, as determined by the first training operation I, so as to receive RS2 with array gain. While receiving the RS2 sequence, the antenna units 2 are sequentially reconfigured to reflect or redirect one or more of the incoming RS2 with beamforming B2 in different output directions (step 305). Thus step 305 implements a scan or beam sweep, which may span the entire physical space in front of the panel device 1. The number of output directions of the complete scan may be predefined. In one embodiment, predefined individual settings, PIS, are applied to the antenna units to achieve the outgoing beamforming B2 in the respective output direction. The PIS may be stored in memory and retrieved and provided to the antenna units by the control device 1A (FIG. 2A). As depicted in FIG. 4E, the panel device 1 may thus be operated by step 305 to scan RS2 in physical space in search for the destination node, represented by D2. The scan of step 305 may continue until a connection has been established with D2, or until a time-out is reached. The scan may be interrupted whenever a response signal is received in a current output direction, e.g. within a predefined time period after reflection of RS2 in the current output direction.

Figure 4F:
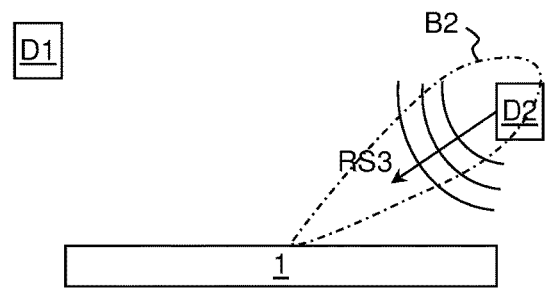

The second training operation II presumes that the destination node D2 is active and operable to detect RS2. When a receiver in D2 intercepts the reflected RS2, D2 may transmit a third reference signal RS3, as shown in FIG. 4F. At this time, the panel device 1 is configured with outgoing beamforming B2 in an approximate direction of D2. The skilled person understands that the outgoing beamforming also causes RS3 to be received with beamforming at the panel device 1. RS3 is thus received at the panel device 1 and corresponds to the response signal that causes the panel device 1 to stop the beam sweep of step 305. In one embodiment, RS2 is generated by D1 to indicate to D2 that D1 seeks to connect to D2 via a panel device. Thereby, D2 may determine from RS2 that it has been reflected by a panel device and that RS3 should be transmitted.

Figure 4G:
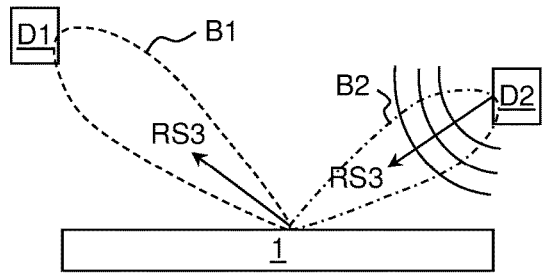

In the second part IIb, the panel device 1 receives RS3 from D2 (step 306). Typically, the panel device 1 is already configured for incoming beamforming B1 in the direction of D1, e.g. by step 303. The skilled person understands that the incoming beamforming B1 also causes RS3 to be reflected with beamforming by the panel device 1 towards D1, as indicated in FIG. 4G.

In one embodiment, upon receipt of RS3 in a current output direction, step 306 uses the PIS of the current output direction as second individual settings, IS2, to achieve the beamforming B2 in relation to D2. In an alternative embodiment, the second part IIb comprises a step 307 of further reconfiguring the antenna units 2 based on at least one further RS3 transmitted by D2. Step 307 involves a fine-tuning of IS2 of the antenna units 2 to optimize the beamforming B2 in relation to D2. It should be realized that the scan of step 305 may, and typically does, result in a beamforming B2 that is less than optimal in relation to D2. Step 307 spatially shifts the beamforming B2 to better match the actual location of D2 in relation to the panel device 1.

In alternative embodiments, not shown, D2 is presumed to continuously or at least intermittently transmit a sequence of reference signals for detection by the panel device 1 during the first part IIa of the second training operation II. For simplicity, the reference signals transmitted by D2 are denoted RS3 in the following. In such alternative embodiments, step 304 may be omitted and step 305 may sequentially reconfigure the antenna units 2 to achieve incoming beamforming in different input directions. Thus, step 305 implements a scan or beam sweep to intercept RS3 transmitted by D2. The incoming beamforming in the respective input direction may be achieved by applying the above-mentioned PIS to the antenna units. By analogy with the description of FIG. 4E, the scan by step 305 may continue until at least one RS3 is received from D2, optionally with a sufficient magnitude, or until a time-out is reached. In some embodiments, the first part IIa further comprises reconfiguring the antenna units 2 to passively reflect RS3 with outgoing beamforming. The panel device 1 thereby effectively retro-reflects RS3 back to D2, which is thereby made aware of the panel device 1 and may infer that the panel device 1 performs the second training operation II and is or will be configured for beamforming in relation D2. It may be noted that the second part IIb of the second training operation II may also be performed based on RS3, for example as described hereinabove with reference to FIGS. 4F-4G. Thus, step 306 may correspond to the panel device 1 receiving the at least one RS3 during the scan by step 305, and step 307 may further reconfigure the antenna units 2 based on at least one further RS3 transmitted by D2.

In step 308, the panel device 1 configures the antenna units to achieve beamforming in relation to both D1 and D2, by applying a combination of IS1 (determined in step 303) and IS2 (determined in step 306 or step 307) to the antenna units. In one embodiment of step 308, the control device 1A may retrieve IS1 from memory, combine IS1 with IS2 and apply the combination to the antenna units. In an alternative embodiment, step 308 is part of the second training operation II, which may be implemented to inherently configure the antenna units to achieve beamforming in relation to both D1 and D2.

Figure 4H:
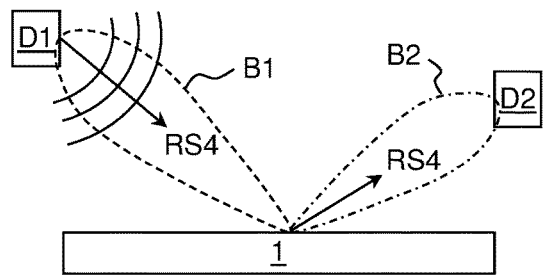

As indicated in FIG. 4H, the second part IIb may further comprise D1 transmitting a fourth reference signal RS4 upon receipt of RS3. RS4 is received and reflected by the panel device 1 to D2, thereby informing D2 that the panel device 1 has successfully determined settings for establishing a communication link between D1 and D2. Optionally, D1 may also transmit a third signal WUS3 for receipt by the wake-up sensor 2A. WUS3 may be configured to indicate to the panel device 1 that the combination of IS1 and IS2 successfully establishes a communication link between D1 and D2.

It is worth noting that once the combination of IS1 and IS2 is applied to the antenna units 2, the panel device 1 consumes little or no power since it is merely passively reflecting incoming RF signals.

One advantage of the first part IIa of the second training operation II is that it allows the panel device 1 to make initial contact with D2, although the panel device 1 is passive and as such unable to by itself generate and transmit a signal to D2. Further, by the first part IIa, D2 may be made aware that D1 wants to connect via a panel device. Further, the first part IIa may allow D1 to transfer data to D2 via the panel device 1, by including such data in RS2. For example, RS2 may include an identifier of D1. The second part IIb of the second training operation II has the advantage of causing the panel device 1 to achieve beamforming in relation to D2, although D2 is unknown to the panel device 1 and possibly also to D1.

In one further embodiment, the first and/or second training operations are repeatedly performed to ensure the quality of the communication link. In one example, the beamforming may change when the environment changes, e.g. if reflecting objects in the vicinity of the panel device 1 are moved. In another example, if D1 and/or D2 are moving, the settings of the antenna units 2 may need to be updated to ensure adequate beamforming. The time and power required for such repeated training is relatively small since the required adjustments of the antenna settings are likely to be quite small.

If the communication link is broken, D1 may transmit WUS1 to re-start the training operations I, II in accordance with FIG. 3.

When D1 and D2 are finished communicating over the communication link, D1 or D2 may transmit a fourth signal WUS4 for receipt by the wake-up sensor 2A. WUS4 may be configured to cause the panel device 1 to tear down the communication link. In one embodiment, WUS4 causes the control device 1A to apply third settings to the antenna units 2. The third settings may be predefined to effectively randomize the reflections by the antenna units 2 or to disable the ability of the antenna unit to reflect incoming RF signals. This will prevent the panel device 1 from being inadvertently configured to reflect an incoming RF signal with outgoing beamforming, which might potentially disturb the operation of communication devices within range.

The foregoing embodiments will be further exemplified with reference to FIG. 5, which illustrates signaling within a system for passive reflection of RF signals. The illustrated example is mapped to the steps in FIG. 3 and also includes some additional steps and variants to be described in the following. D1 transmits WUS1 which is received by the wake-up sensor 2A and causes the panel device 1 to initiate the first training operation (step 301). After a predetermined time, D1 starts transmitting a sequence of RS1, which are received by the panel device 1 (step 302). The sequence of RS1 may be transmitted with a predefined time spacing. During step 303A, the panel device 1 gradually tunes its antenna units 2 based on the respective RS1 to achieve incoming beamforming. When the incoming beamforming is completed (step 303), the panel device 1 may be operated to achieve outgoing beamforming and thereby retro-reflect RS1 to D1 (step 303B). Alternatively, step 303A may gradually tune the antenna units 2 to achieve both incoming and outgoing beamforming in relation to D1, which inherently causes RS1 to be retro-reflected to D1 whenever the beamforming is sufficient. Upon receipt of the retro-reflected RS1, D1 stops transmitting RS1. D1 may then transmit WUS2 which is received by the wake-up sensor 2A (step 304A) and causes the panel device 1 to initiate the second training operation. D1 starts transmitting a sequence of RS2, which are received by the panel device 1 (step 304). The panel device 1 reflects RS2 with outgoing beamforming while intermittently changing the output direction of the outgoing beamforming (step 305). Before proceeding from one output direction to another, the panel device 1 waits for RS3. Although not shown in FIG. 5, plural RS2 may be reflected by the panel device 1 in each output direction. In the example of FIG. 5, the third output direction results in RS2 being received by D2. RS2 causes D2 to start transmitting a sequence of RS3, which are received by the panel device 1 (step 306). D2 may repeatedly transmit RS3 until it receives RS4 (below) or for a predefined time period. D2 may be configured to transmit RS3 at time slots that are non-overlapping with time slots used by D1 to transmit RS2. For example, there may be known time gap between consecutive RS2, and D2 may transmit RS3 at half of that time gap. This will ensure that the panel device 1 is able to operate on both RS2 and RS3.

During step 307A, the panel device 1 gradually adjusts its antenna units 2 based on the respective RS3 to fine-tune the beamforming in relation to D2. When the incoming beamforming is completed and IS2 of the antenna units has been determined (step 307), the panel device 1 may be operated to achieve beamforming in relation to D1 and thereby reflect RS3 to D1 (step 307B). Alternatively, the panel device 1 may reflect RS3 to D1 already in step 306 and then continue to perform the fine-tuning in accordance with step 307A. Upon receipt of RS3, and optionally after a predetermined waiting time, D1 may transmit WUS3 which is received by the wake-up sensor 2A and causes the panel device 1 to apply the combination of IS1 and IS2 to the antenna units (step 308). D1 then transmits RS4 which is passively reflected by the panel device 1 to D2 with beamforming in both reception and reflection (step 308B). Upon receipt of RS4, D2 is ready to communicate with D1 via the panel device 1, as indicated by step 309.

The foregoing description presumes that the first and second training operations I, II are performed in sequence to establish the communication link between D1 and D2. However, it is conceivable that the second training operation is omitted or performed well in advance of the first training operation I, e.g. if D2 is known to be stationary in relation to the panel device 1. D2 may for example be a stationary base station. An example embodiment of steps performed by the panel device is illustrated in FIGS. 6A-6B. FIG. 6A represents a preparatory pairing method in relation to D2, and FIG. 6B represents a method of establishing a communication link between D1 and D2 by use of antenna settings obtained by the pairing method. The pairing method of FIG. 6A starts by D2 transmitting a pairing activation signal which is detected by the panel device 1, e.g. by the wake-up sensor 2A (step 601). The pairing activation signal causes the panel device 1 to prepare for a pairing operation. After transmitting the pairing activation signal, D2 transmits one or more pairing reference signals. The panel device 1 receives the respective pairing reference signal (step 602) and determines, based on the pairing reference signal, IS2 of the antenna units 2 to achieve incoming beamforming in the direction of D2 (step 603). It is realized that the pairing method corresponds to the first training operation. Thus, step 603 may correspond to step 303 in FIG. 3 with the difference that step 603 operates on the pairing reference signals and results in IS2. IS2 is then stored in memory (step 604).

Turning now to the method in FIG. 6B, D1 initiates the first training operation I and the panel device 1 performs steps 301-303 in correspondence with the method in FIG. 3. At completion of step 303, the panel device 1 has determined IS1 to achieve beamforming in relation to D1. Then, in step 305', the panel device 1 retrieves IS2 from memory and applies a combination of IS1 and IS2 to the antenna units 2 to thereby configure the panel device 1 for passive reflection of RF signals between D1 and D2 with beamforming in both reception and reflection.

Step 604 may involve storing IS2 in association with an identifier of D2, which may be provided to the panel device 1 in the pairing activation signal. Thus, the pairing method in FIG. 6A may be performed in relation to each of a plurality of communication devices, and IS2 for the respective communication device is stored in memory in association with the identifier of the respective communication device. Correspondingly, D1 may provide the identifier of D2 to the panel device 1 in WUS1 (step 301), thereby enabling the panel device 1 in step 305' to retrieve the correct IS2 from the memory 5. In an alternative, the pairing method in FIG. 6A may be omitted, and a predefined codebook of IS2 for different communication devices may be stored in the memory 5.

Figure 7:
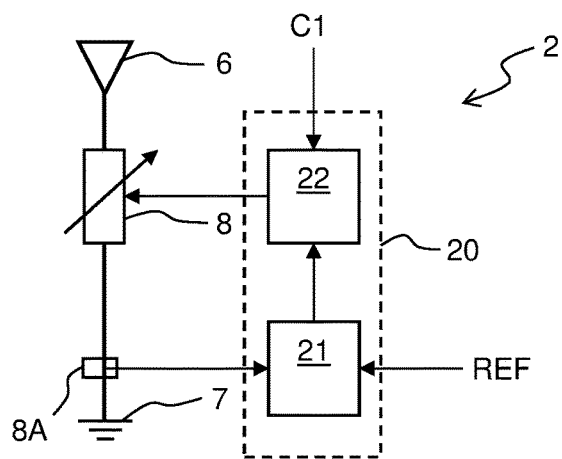
FIG. 7 is a circuit diagram of an example antenna unit in a system for passive reflection.

An example of an antenna unit 2 is schematically depicted in FIG. 7. The antenna unit 2 comprises an antenna 6, which is connected on an electrically conducting path to an RF reflection element 7, which is reflective to an antenna signal ASn that is generated by the antenna 6 in response to an incoming RF signal. In the illustrated example, the RF reflection element 7 is a ground plane. In another example, the RF reflecting element 7 is defined by another type of discontinuity in the characteristic impedance of the conducting path, e.g. an open end. A tunable phase shifter 8 is disposed in the conducting path in series with the antenna 6. The phase shifter 8 is operable to modify the phase of the antenna signal, e.g. by modifying its capacitance and/or inductance or by otherwise time-delaying the antenna signal. In one non-limiting example, the phase shifter 8 is a varactor diode or an inductor. The antenna unit 2 further comprises a local control device 20, which includes a phase comparator 21 and a phase controller 22. The phase comparator 21 is arranged to receive the antenna signal, from a coupler or switch 8A in the conducting path, to receive a reference signal REF from a reference antenna (not shown) and to output a measurement signal indicative of the phase difference between these signals. The coupler/switch 8A is a passive element arranged between the phase shifter 8 and the RF reflection element 7. The coupler/switch 8A may be a directional element that is configured to only divert, to the phase comparator 21, power flowing in one direction in the conductive path, either towards or away from the RF reflecting element 7. The phase controller 22 is operable in either an adaptive mode or a static mode. In the adaptive mode, the phase controller 22 adjusts the phase shifter 8 to achieve a target value of the measurement signal from the phase comparator 21, where the target value corresponds to a phase alignment of the antenna signal and the reference signal. In the adaptive mode, the local control device 20 operates a control loop defined by analogue circuitry to automatically determine a setting of the phase shifter 8 that results in the phase alignment. In the static mode, the phase controller 22 applies a predetermined setting (cf. IS1, IS2) to the phase shifter 8. The phase controller 22 may retrieve the predetermined setting from a local memory (not shown) in the antenna unit 2, or the predetermined setting may be retrieved from the memory 5 by the processor 4 and provided to the phase controller 22. The phase controller 22 may switch between the adaptive and static modes based on a control signal C1 from the processor 4. It is understood that the antenna units 2 may be set in the adaptive mode during the first and second training operations I, II, and in the static mode during the reflection operation III.

The reference antenna 6' may be a dedicated antenna in the system 1. Alternatively, an antenna of one of the antenna units 2 in the system 1 may be deployed as a reference antenna, provided that the phase shifter is set to a fixed phase value (e.g. zero) during the first and second training operations I, II.

In the context of the present disclosure, the control device 1A and (if present) the local control devices 20 in the antenna units 2 are considered to collectively define a "control system" of the panel device 1.

Figure 8A:
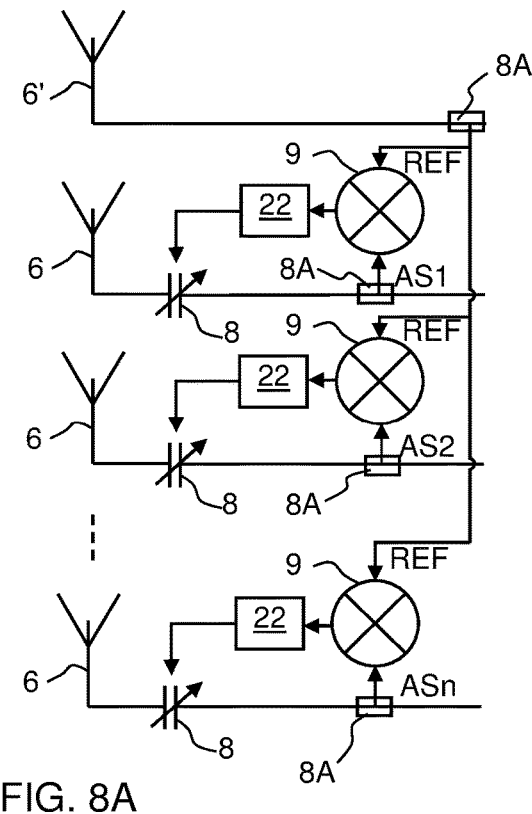
FIGS. 8A-8B are schematic circuit diagrams of example structures for phase adjustment of antenna units.

FIG. 8A is a first schematic implementation example of electronic circuitry that automatically phase aligns analog signals of different antennas. The upper antenna is used as the reference antenna 6'. An analog multiplier (mixer) 9 is arranged in each antenna unit to multiply the analog reference signal REF of reference antenna 6' with the analog antenna signal AS1, . . . , ASn of the antenna 6 in the respective antenna unit. A phase controller 22 is arranged to receive the analog output signal of the multiplier 9 and adjust a phase shifter 8 to optimize (e.g. maximize or minimize) a magnitude (e.g. power) of the analog output signal, or an analog signal derived therefrom. With reference to FIG. 7, the analog multiplier 9 corresponds or is included in the phase comparator 21.

Figure 8B:
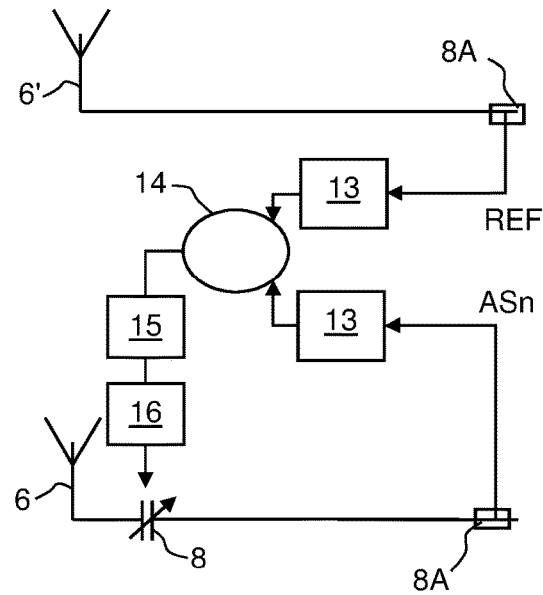

FIG. 8B is a second schematic implementation example of the electronic circuitry of an antenna unit. Identical bandpass filters 13 (BPF) are arranged to transmit the analog reference signal REF and the respective analog antenna signal (ASn in FIG. 5B) within a defined frequency band. A combiner 14 is arranged to receive input signals from the bandpass filters 13. In a first example, the combiner 14 is an analog multiplier or mixer, and a low-pass filter 15 is arranged to extract the DC component of the output signal of the mixer 14. The DC component is representative of the phase difference between the input signals to the mixer 14. The illustrated circuit then operates to optimize (e.g. maximize or minimize) the DC component, and a sample-and-hold device 16 is arranged to hold the optimized DC component. In a second example, the combiner 14 is an analog adder and one of the input signals to the adder is inverted (phase shifted by 180 degrees) so that the adder outputs an analog difference signal representative of the difference between the input signals. A power detector 15 is arranged to measure the power of the difference signal. The power is representative of the phase difference between the input signals to the adder 14. The illustrated circuit then operates to minimize the power, and a sample-and-hold device 16 is arranged to hold the minimized power value. One advantage of the second example over the first example is that the second example uses the full bandwidth of the input signals to the combiner 14. In the first example, a mixed-down DC component is isolated, which results in a loss of power components that are not mixed down to DC.

While the subject of the present disclosure has been described in connection with what is presently considered to be the most practical and preferred embodiments, it is to be understood that the subject is not to be limited to the disclosed embodiments, but on the contrary, is intended to cover various modifications and equivalent arrangements included within the spirit and the scope of the appended claims.

Further, while operations are depicted in the drawings in a particular order, this should not be understood as requiring that such operations be performed in the particular order shown or in sequential order, or that all illustrated operations be performed, to achieve desirable results. In certain circumstances, parallel processing may be advantageous.

In the following, items are recited to summarize some aspects and embodiments as disclosed in the foregoing.

Item 1. A system for reflecting an RF signal, comprising:
a plurality of antenna units (2) which are configured to receive the RF signal and passively reflect the RF signal, wherein the antenna units are reconfigurable to achieve beamforming in reception and reflection, respectively, of the RF signal, and
a control system (1A, 20) in communication with the respective antenna unit (2), said control system (1A, 20) being configured to:
detect a wake-up signal (WUS1), and
after detecting the wake-up signal (WUS1), perform a first training operation (1) comprising:
receiving, by the antenna units (2), a first reference signal (RS1) from a first device (D1), and
reconfiguring the antenna units (2) based on the first reference signal (RS1) to achieve beamforming in reception in a direction of the first device (D1).

Item 2. The system of item 1, wherein the first training operation (I) further comprises reconfiguring the antenna units (2) to passively reflect the first reference signal (RS1) with beamforming in the direction of the first device (D1).

Item 3. The system of item 1 or 2, wherein the first training operation (I) comprises determining, for the first reference signal (RS1), first individual settings of the antenna units (2) to achieve beamforming in reception in the direction of the first device (D1).

Item 4. The system of item 3, wherein the first individual settings are determined to phase align first analog antenna signals received by the antenna units (2) in response to the first reference signal (RS1).

Item 5. The system of item 4, wherein the first analog antenna signals are phase aligned with each other, so that a first of the first analog antenna signals is phase aligned with a second of the first analog antenna signals.

Item 6. The system of item 4 or 5, wherein the first training operation (I) comprises receiving, by the antenna units (2), a sequence of first reference signals (RS1) from the first device (D1), and adjusting individual settings of the antenna units (2) based on the sequence of first reference signals (RS1) to determine the first individual settings.

Item 7. The system of any preceding item, wherein the control system (1A, 20) is configured to perform a second training operation (II) comprising: reconfiguring the antenna units (2) to achieve beamforming in a sequence of different directions and, upon detection of a third reference signal (RS3) from a second device (D2), configuring the antenna units (2) to achieve beamforming in a direction of the second device (D2).

Item 8. The system of item 7, wherein the second training operation (II) comprises: applying predefined individual settings to the antenna units (2) to achieve said beamforming in a respective direction among the different directions.

Item 9. The system of item 7 or 8, wherein the second training operation (II) comprises: receiving, by the antenna units (2), a sequence of second reference signals (RS2) from the first device (D1); wherein the antenna units (2) are reconfigured to achieve beamforming in reflection of the second reference signals (RS2) in the sequence of different directions.

Item 10. The system of item 9, which is configured to, during the second training operation (II) receive the third reference signal (RS3) in a time period between two of the second reference signals (RS2).

Item 11. The system of item 9 or 10, wherein the second training operation (II) comprises receiving at least one of the second reference signals (RS2) from the first device (D1) with the antenna units (2) reconfigured to achieve beamforming in reception in the direction of the first device (D1).

Item 12. The system of item 7 or 8, wherein, in the second training operation (II), the antenna units (2) are reconfigured to achieve beamforming in reception in the sequence of different directions.

Item 13. The system of any one of items 7-12, wherein the second training operation (II) comprises determining, for the third reference signal (RS3), second individual settings of the antenna units (2) to achieve beamforming in the direction of the second device (D2), wherein the second individual settings are determined to phase align analog antenna signals received by the antenna units (2) in response to the third reference signal (RS3).

Item 14. The system of item 13, wherein the second training operation (II) comprises: receiving, by the antenna units (2), a sequence of third reference signals (RS3) from the second device (D2), and adjusting the individual settings of the antenna units (2) based on the sequence of third reference signals (RS3) to determine the second individual settings.

Item 15. The system of any one of items 7-14, wherein the control system (1A, 20) is configured to perform a reflection operation (III) comprising: setting the antenna units (2) to achieve beamforming in the direction of the first device (D1) and in the direction of the second device (D2) to thereby configure the system to redirect an incoming RF signal from the first device (D1) to the second device (D2), and from the second device (D2) to the first device (D1).

Item 16. The system of any one of items 1-6, wherein the control system (1A, 20) is operable to: detect an activation signal for pairing; receive, in response to the activation signal, one or more pairing reference signals from a second device (D2); determine second individual settings of the antenna units (2), based on the one or more pairing reference signals, to achieve beamforming in reception in a direction of the second device (D2), and store the second individual settings.

Item 17. The system of item 16, wherein the control system (1A, 20) is configured to perform a reflection operation (III) comprising: retrieving the second individual settings, setting the antenna units (2) to achieve beamforming in the direction of the first device (D1) and, based on the second individual settings, setting the antenna units (2) to achieve beamforming in the direction of the second device (D2), to thereby configure the system to redirect an incoming RF signal from the first device (D1) to the second device (D2), and from the second device (D2) to the first device (D1).

Item 18. The system of any preceding item, said beamforming in reception and reflection, respectively, is achieved by adjustment of individual settings of the antenna units (2).

Item 19. The system of item 18, wherein said individual settings correspond to a phase change imposed on an analog antenna signal received by the respective antenna unit (2).

Item 20. The system of any preceding item, further comprising a wake-up sensor (2A), which is separate from the antenna units (2) and configured to detect the wake-up signal (WUS).

Item 21. A method in a system for reflecting an RF signal, said system comprising a plurality of antenna units (2) which are configured to receive the RF signal and passively reflect the RF signal, wherein the antenna units are reconfigurable to achieve beamforming in reception and reflection, respectively, of the RF signal, said method comprising:
detecting (301) a wake-up signal (WUS1),
receiving (302), by the antenna units (2) and after detecting the wake-up signal (WUS1), a first reference signal (RS1) from a first device (D1), and
reconfiguring (303) the antenna units (2) to achieve beamforming in reception in a direction of the first device (D1).

Item 22. The method of item 21, further comprising: reconfiguring (305) the antenna units (2) to achieve beamforming in a sequence of different directions; and, upon detection (306) of a third reference signal (RS3) from a second device (D2), configuring (307) the antenna units (2) to achieve beamforming in a direction of the second device (D2).

Item 23. The method of item 22, further comprising: receiving (304), by the antenna units (2), a sequence of second reference signals (RS2) from the first device (D1); wherein the antenna units (2) are reconfigured (305) to achieve beamforming in reflection of the second reference signals (RS2) in the sequence of different directions.

Item 24. The method of item 22, wherein the antenna units (2) are reconfigured to achieve beamforming in reception in the sequence of different directions.

Item 25. The method of any one of items 22-24, further comprising: setting (308) the antenna units (2) to achieve beamforming in the direction of the first device (D1) and in the direction of the second device (D2), thereby configuring the system to redirect an incoming RF signal from the first device (D1) to the second device (D2), and from the second device (D2) to the first device (D1).

Item 26. A computer-readable medium comprising computer instructions which, when executed by a processor (4), cause the processor (4) to perform the method of any one of items 21-25.

The invention claimed is:

1. A system for reflecting an RF signal, comprising:
a plurality of antenna units which are configured to receive the RF signal and passively reflect the RF signal, wherein the antenna units are reconfigurable to achieve beamforming in reception and reflection, respectively, of the RF signal, and
a control system in communication with the respective antenna unit, said control system being configured to:
detect a wake-up signal,
after detecting the wake-up signal, perform a first training operation comprising:
receiving, by the antenna units, a first reference signal from a first device, and
reconfiguring the antenna units based on the first reference signal to achieve beamforming in reception in a direction of the first device,
perform a second training operation comprising reconfiguring the antenna units to achieve beamforming in a sequence of different directions and, upon detection of a third reference signal from a second device, configuring the antenna units to achieve beamforming in a direction of the second device, and
perform a reflection operation comprising setting the antenna units to achieve beamforming in the direction of the first device and in the direction of the second device to thereby configure the system to redirect an incoming RF signal from the first device to the second device, and from the second device to the first device.

2. The system of claim 1, wherein the first training operation further comprises reconfiguring the antenna units to passively reflect the first reference signal with beamforming in the direction of the first device.

3. The system of claim 1, wherein, in the second training operation, the antenna units are reconfigured to achieve beamforming in reception in the sequence of different directions.

4. The system of claim 1, wherein the second training operation comprises determining, for the third reference signal, second individual settings of the antenna units to achieve beamforming in the direction of the second device, wherein the second individual settings are determined to phase align analog antenna signals received by the antenna units in response to the third reference signal.

5. The system of claim 4, wherein the second training operation comprises: receiving, by the antenna units, a sequence of third reference signals from the second device, and adjusting the individual settings of the antenna units based on the sequence of third reference signals to determine the second individual settings.

6. The system of claim 1, wherein the control system is operable to: detect an activation signal for pairing; receive, in response to the activation signal, one or more pairing reference signals from a second device;
determine second individual settings of the antenna units, based on the one or more pairing reference signals, to achieve beamforming in reception in a direction of the second device; and store the second individual settings.

7. The system of claim 6, wherein the control system is configured to perform a reflection operation comprising: retrieving the second individual settings, setting the antenna units to achieve beamforming in the direction of the first device and, based on the second individual settings, setting the antenna units to achieve beamforming in the direction of the second device, to thereby configure the system to redirect an incoming RF signal from the first device to the second device, and from the second device to the first device.

8. The system of claim 1, wherein beamforming in reception and reflection, respectively, is achieved by adjustment of individual settings of the antenna units, wherein said individual settings correspond to a phase change imposed on an analog antenna signal received by the respective antenna unit.

9. The system of claim 1, further comprising a wake-up sensor, which is separate from the antenna units and configured to detect the wake-up signal.

10. A system for reflecting an RF signal, comprising:
a plurality of antenna units which are configured to receive the RF signal and passively reflect the RF signal, wherein the antenna units are reconfigurable to achieve beamforming in reception and reflection, respectively, of the RF signal, and
a control system in communication with the respective antenna unit, said control system being configured to:
detect a wake-up signal,
after detecting the wake-up signal, perform a first training operation comprising:
receiving, by the antenna units, a first reference signal from a first device, and
reconfiguring the antenna units based on the first reference signal to achieve beamforming in reception in a direction of the first device,
perform a second training operation comprising:
receiving, by the antenna units, a sequence of second reference signals from the first device, wherein the antenna units are reconfigured to achieve beamforming in reflection of the second reference signals in a sequence of different directions, and upon detection of a third reference signal from a second device, configuring the antenna units to achieve beamforming in a direction of the second device.

11. The system of claim 10, which is configured to, during the second training operation, receive the third reference signal in a time period between two of the second reference signals.

12. The system of claim 10, wherein the second training operation comprises receiving at least one of the second reference signals from the first device with the antenna units reconfigured to achieve beamforming in reception in the direction of the first device.

13. A method in a system for reflecting an RF signal, said system comprising a plurality of antenna units which are configured to receive the RF signal and passively reflect the RF signal, wherein the antenna units are reconfigurable to achieve beamforming in reception and reflection, respectively, of the RF signal, said method comprising:
detecting a wake-up signal,
receiving, by the antenna units and after detecting the wake-up signal, a first reference signal from a first device,
reconfiguring the antenna units to achieve beamforming in reception in a direction of the first device,
reconfiguring the antenna units to achieve beamforming in a sequence of different directions,
upon detection of a third reference signal from a second device, configuring the antenna units to achieve beamforming in a direction of the second device, and
setting the antenna units to achieve beamforming in the direction of the first device and in the direction of the second device, thereby configuring the system to redirect an incoming RF signal from the first device to the second device, and from the second device to the first device.

14. The method of claim 13, further comprising: receiving, by the antenna units, a sequence of second reference signals from the first device, wherein the antenna units are reconfigured to achieve beamforming in reflection of the second reference signals in the sequence of different directions.

15. The method of claim 13, wherein the antenna units are reconfigured to achieve beamforming in reception in the sequence of different directions.

16. A non-transitory computer-readable medium comprising computer instructions which, when executed by a processor, cause the processor to perform the method of claim 13.

* * * * *